Aug. 9, 1938.   O. W. PINEO   2,126,410
SPECTROPHOTOMETER
Filed March 18, 1935   4 Sheets-Sheet 1

INVENTOR.
ORRIN W. PINEO,
BY Robert Ames Norton
ATTORNEY.

Aug. 9, 1938. O. W. PINEO 2,126,410
SPECTROPHOTOMETER
Filed March 18, 1935 4 Sheets-Sheet 2

INVENTOR.
ORRIN W. PINEO,
BY Robert Ames Norton
ATTORNEY.

Aug. 9, 1938.  O. W. PINEO  2,126,410
SPECTROPHOTOMETER
Filed March 18, 1935   4 Sheets-Sheet 3

INVENTOR
ORRIN W. PINEO,
BY
ATTORNEY.

Aug. 9, 1938. O. W. PINEO 2,126,410
SPECTROPHOTOMETER
Filed March 18, 1935 4 Sheets-Sheet 4

INVENTOR.
ORRIN W. PINEO,
BY
ATTORNEY.

Patented Aug. 9, 1938

2,126,410

UNITED STATES PATENT OFFICE 2,126,410

SPECTROPHOTOMETER

Orrin Weston Pineo, Milo, Maine, assignor to The Calco Chemical Company, Inc., Bridgewater Township, New Jersey, a corporation of Delaware Application March 18, 1935, Serial No. 11,600
In Great Britain March 19, 1934

13 Claims. (Cl. 88—14)

The invention relates to photometers and more particularly to spectrophotometers of the type by means of which a curve can be drawn representing strength of light, reflecting power or like quantity as a function of wave-lengths.

The object of this invention is to provide an improved polarization flicker system for use in photo-electric photometers.

Apparatus relating to this art has already been constructed and a description has been published, e. g., in The Journal of the Optical Society of America, vol. 18, No. 2, February, 1929, pages 96 et seq. In the apparatus described there, color is determined by comparison with a standard and the flicker principle is used as the basis of action of what is in effect a relay device to adjust the illumination of the standard automatically, so that equal response is produced on a photo-cell by light reflected from the specimen and the standard. It is moreover suggested as an alternative construction that the monochromator which forms an essential part of the apparatus should be inserted in the path of the incident light so that the specimen and standard are illuminated by monochromatic light.

A logical development of the arrangement using the flicker principle is to use for the illumination of the specimen and the standard two beams of light polarized in planes at right angles to each other and to pass them through a rotating Nicol prism so that they may be varied in opposite phase to produce a flicker if there is any difference between the light reflected from the specimen and the standard. By that method, the light incident on the specimen is varying its plane of polarization, so that in many cases an unknown factor of variation is introduced which may vitiate the results. Further, spurious signals of the fundamental and harmonic frequencies are produced in the photo-cell circuit which obscure the vanishing signal at balance and so result in loss of sensitivity in detecting the balance point.

According to the present invention in a spectrophotometer having a flicker device for varying the illumination of the specimen and the standard in a complementary manner by polarization, the orientations of polarization of the two beams are caused to rotate or oscillate together by appropriate means and the beams which thus have varying orientations of polarization and substantially constant intensity are passed through a stationary polarizing device so that they emerge with a stationary plane of polarization and varying intensity to give the required oppositely phased flicker illumination of the specimen and the standard.

If a material is being investigated which has different reflective properties with different orientations of the plane of polarization of the incident light, as is frequently the case, the result, with the use of the present invention, will be perfectly definite since the plane of polarization is fixed in relation to the specimen. A complete specification of the reflective properties can be obtained by combining with this result the result of further tests with the specimen at other suitable orientations with relation to the plane of polarization in the instrument. It will also be seen that both beams emerging from the stationary polarizing device are polarized in the same plane, which facilitates the operation of comparing two specimens having directional properties.

The most convenient order in which the light traverses the various elements is probably monochromator, photometer, flicker device, sample, receptor, but the invention could also be applied to other arrangements, e. g., with the monochromator between the sample and the receptor.

The two beams of light are preferably polarized in planes at right angles to each other, and this may be ensured by the use of a Wollaston prism which also gives the beams a small difference in direction. The relative strengths of the two beams for photometric purposes can then be adjusted if plane polarized light is passed to the Wollaston prism by varying its plane of polarization.

Various methods are available to produce the flicker and these will be considered briefly in relation to beams polarized in planes perpendicular to each other as suggested above.

In one method the beams are passed through a medium having magnetic rotatory power and subjected to a periodically varying magnetic field which causes an oscillation of the planes of polarization of the beams. The angular amplitude of the oscillation will depend on the field strength and is preferably made $\pi/4$ on each side of the mean position so that at each extreme position one beam is extinguished and the other is practically unaltered in intensity by the Nicol or other stationary polarizing device folowing the magnetic arrangement.

A second method makes use of the relative retardation effected by two quarter wave plates. The first one is stationary and converts the two beams into beams of circularly polarized light. The axis of the wave plate is set at 45° to the plane of polarization of the incident beams so that the beams emerge with opposite directions of circular polarization. The second quarter wave plate rotates and converts the two beams of circularly polarized light into beams polarized in planes perpendicular to each other. By virtue of the rotation of the second quarter wave plate the planes of polarization of the emergent beams are rotating at the same speed as the quarter wave plate. A Nicol or other stationary polarizing device follows the quarter wave plates as before.

A third method uses the retardation effected by a Kerr cell. The Kerr cell is located in the same position as the magnetically rotatory medium above referred to and the plates are supplied with alternating current preferably biased with a D. C. voltage equal to the peak value to maintain the voltage unidirectional. The varying retardation thus produced again varies the polarization of the two beams of light.

A fourth and preferred method consists in applying constant retardation to the beams but periodically varying the orientation of this retardation. This is accomplished by the use of a rotating half wave plate followed by a suitably oriented polarizing device. Considering a beam polarized in a vertical plane and the half wave plate with its axis of zero difference of retardation vertical, no effect is produced on the beam. If the wave plate has this same axis horizontal, the beam is still vertically polarized but with a difference of phase of $\pi$ due to the relative retardation. In intermediate positions different proportions of differently retarded light are passed through. The result is that the polarization of each beam is periodically modified so that the stationary polarizing device causes a corresponding variation of intensity in each beam.

In these four arrangements the curve which represents the intensity of one emergent beam plotted against time is not necessarily the same. This curve may be sinusoidal or it may be of other forms; also due to the chromatic variation of magnetic rotatory power and of electric and ordinary birefringence this curve in a given case may vary through the spectrum and some of the polarizations referred to above as plane may in the general case be elliptical. All that is necessary is a periodic variation of the intensities of the two beams in oposite phase of such a nature that when the average intensities of the beams are properly adjusted with respect to specimen and standard the response of the receptor arrangement is constant. The amplitude of the periodic variation between the beams is made as large as convenient.

The drawings show four embodiments of the invention in perspective.

Figure 1:
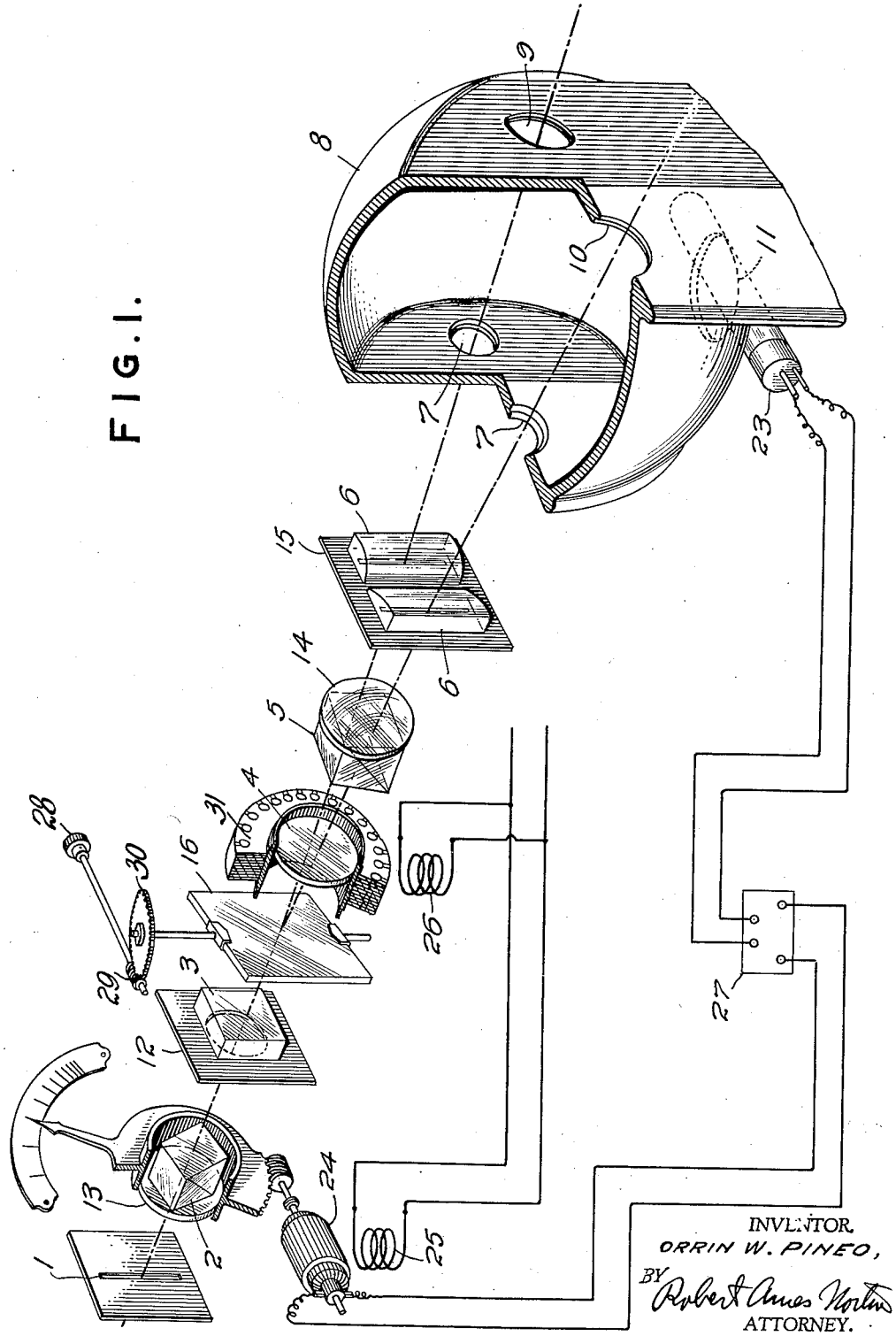
Fig. 1 is a perspective view of the optical system using a half wave plate for varying the states of polarization of the emerging beams.

Referring to Fig. 1, light from a suitable source is passed through a double monochromator. The monochromator may be of any suitable known construction, the monochromator being represented in the figure by its exit slit 1.

The light path is indicated by a chain dotted line in its passage through the various optical elements. Monochromatic light proceeds from the monochromator slit 1 and is plane polarized by a polarizing prism 2, referred to as the photometer prism, which may be a Nicol prism but preferably for the saving of material is of the achromatic glass Rochon type. This prism is rotatably adjustable about its optical axis to vary the plane of polarization of the light emerging from it for the purpose of varying the relative strengths of the two beams of l'ght falling on the specimen and standard as will now be described.

The light so polarized falls on a Wollaston prism 3 which divides it into two beams polarized at right angles to each other and diverging slightly in direction. The prism 3 is of fixed location and accordingly the ratio of strengths of the two beams varies in dependence on the plane of polarization of the light incident on it, that is, on the angular setting of the photometer prism 2.

A retardation plate 4, preferably a half wave plate, is rotated by the synchronous motor 31 at a suitable speed on the optical axis and so produces a retardation of the two beams varying with a phase difference of 90° due to the 90° difference in plane of polarization.

A stationary prism 5 called the flicker prism and exactly similar to the photometer prism 2 polarizes both beams in the same stationary or fixed plane. On account of the varying retardation of the two beams of light entering the flicker prism, the beams vary in intensity on emergence from this prism, but the effect of the phase difference is to make the intensity variation of the two complementary, so that on correct adjustment the light of one beam reflected from the specimen and that of the other beam from the standard add up to a constant amount. The prism 3, half wave plate 4 and prism 5 are the important elements in the flicker mechanism above referred to.

The beams of light varying in intensity as just mentioned are directed respectively onto the sample and standard. The light transmitted or reflected by the sample and standard is collected in a manner appropriate to their nature and the desired conditions of measurement, and is subsequently received by a light-sensitive element. The preferred method for a large class of samples is to average the light transmitted or reflected in the various directions from the sample and standard by means of an integrating sphere 8.

The beams of light just mentioned pass through segmental lenses 6 to increase their relative angle of divergence and enter by openings 7 the hollow integrating sphere 8 coated internally with magnesium oxide. Apertures 9 and 10 are provided on the opposite side of the sphere to the openings 7 for a specimen and standard. Cells may be placed in front of the openings 7 for use in measuring transmission of light through a specimen. A window 11 is provided at a suitable location on the sphere for the accommodation of a photo-cell 23 to detect the flicker. The photo-cell current is amplified by the high gain amplifier 27 and the amplified current used to operate an adjusting motor 24 rotating the photometer prism 2 to such a position that equality of response is given on the photo-cell by light reflected from the specimen behind the opening 9 and the standard behind the opening 10. The motor 24 and the motor rotating the half wave plate 4 are provided with fields 25 and 26 respectively which are operated from a source of alternating curent of constant frequency such as a standard 110 v., A. C. line.

A definite area of the sample and standard is illuminated by the arangement described but if it is desired to vary the illuminated area alternative lenses or combinations of lenses may be fitted in place of the segmental lenses 6, or elsewhere in the system, to illuminate a smaller or larger area.

Further optical elements are shown in the drawings and these wil now be described. A round aperture stop 12 is located immediately in front of the Wollaston prism 3, to limit the aperture of the system. The photometer prism has a lens 13 cemented to its front face and set to focus the dispersing prism of the monochomator on to the aperture stop 12. This lens has a slight cylindrical power to compensate partially the astigmatic imagery of the photometer prism 2, a similar lens 14 is cemented to the rear surface of the flicker prism 5 and serves in conjunction with the segmental lenses 6 to focus the aperture stop 12 onto the specimen behind the opening 9 and standard behind the opening 10. The lens 14 also focuses the exit slit 1 on to a slit image stop 15, which has two rectangular apertures each just large enough to pass an image of the exit slit 1. The function of the stop 15 is to intercept the beams and polarizations discarded by the glass Rochon polarizing element and not otherwise disposed of.

It may occur in checking the instrument with two standard surfaces, for instance of magnesium carbonate, that there is an apparent inequality between the two surfaces due to slight differences in the action of the optical elements on the two beams. An adjusting plate 16 rotated by the knob 28 through the worm 29 and worm gear 30 is provided between the Wollaston prism 3 and the half wave plate 4 to adjust the relative strengths of the two beams to compensate for such inequality. This plate is merely an optical flat, perpendicular to the optical axis and made rotatable on a vertical axis so as to change, due to the well known effect of polarization in transmission through an oblique plate, the relative intensities of the two beams by any amount up to say 5% by appropriate setting.

It will be seen that all movable parts in the optical system, except the half wave plate 4, are movable only by way of adjustment, that is they are practically stationary for any one reading or point on the curve. The half wave plate 4 is the only optical element moved for the purpose of flicker, and since its total effect on the beams of light apart from the change of phase is exceedingly small it cannot produce any disturbances in the operation of the instrument such as would be introduced by a rotating glass Rochon prism due to its astigmatism and asymmetrical absorption.

Figure 2:
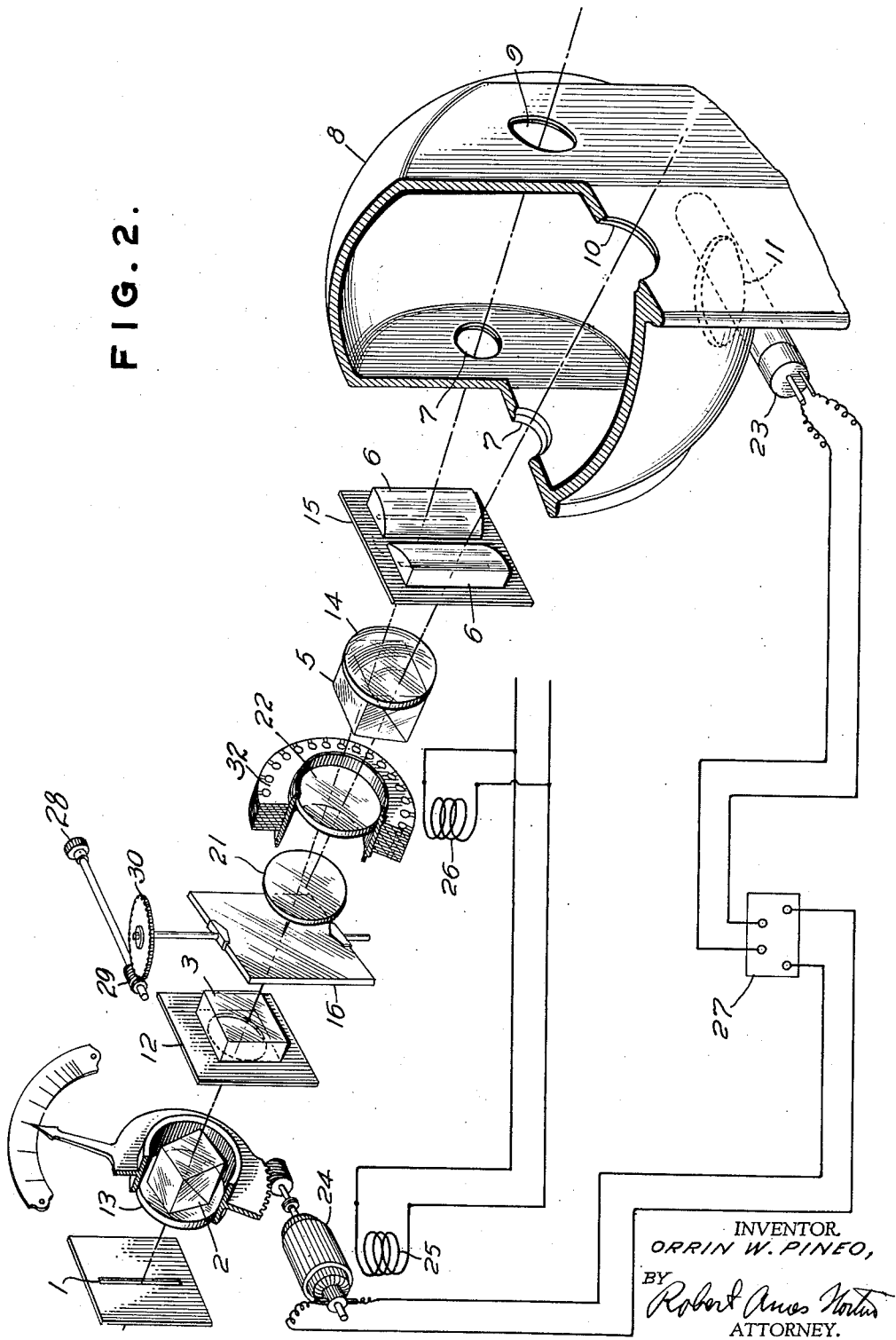
Fig. 2 is a perspective view of an optical system using a quarter wave plate for varying the states of polarization of the emerging beams.

Fig. 2 shows an optical system similar to Fig. 1 but in which a pair of quarter wave plates 21 and 22 replace the half wave plate of Fig. 1. Quarter wave plate 21 is stationary and quarter wave plate 22 is rotated by the synchronous motor 32. The beams emerging from the stationary quarter wave plate are circularly polarized in opposite directions. On emerging from the rotating quarter wave plate, the beams are polarized in planes perpendicular to each other.

Figure 3:
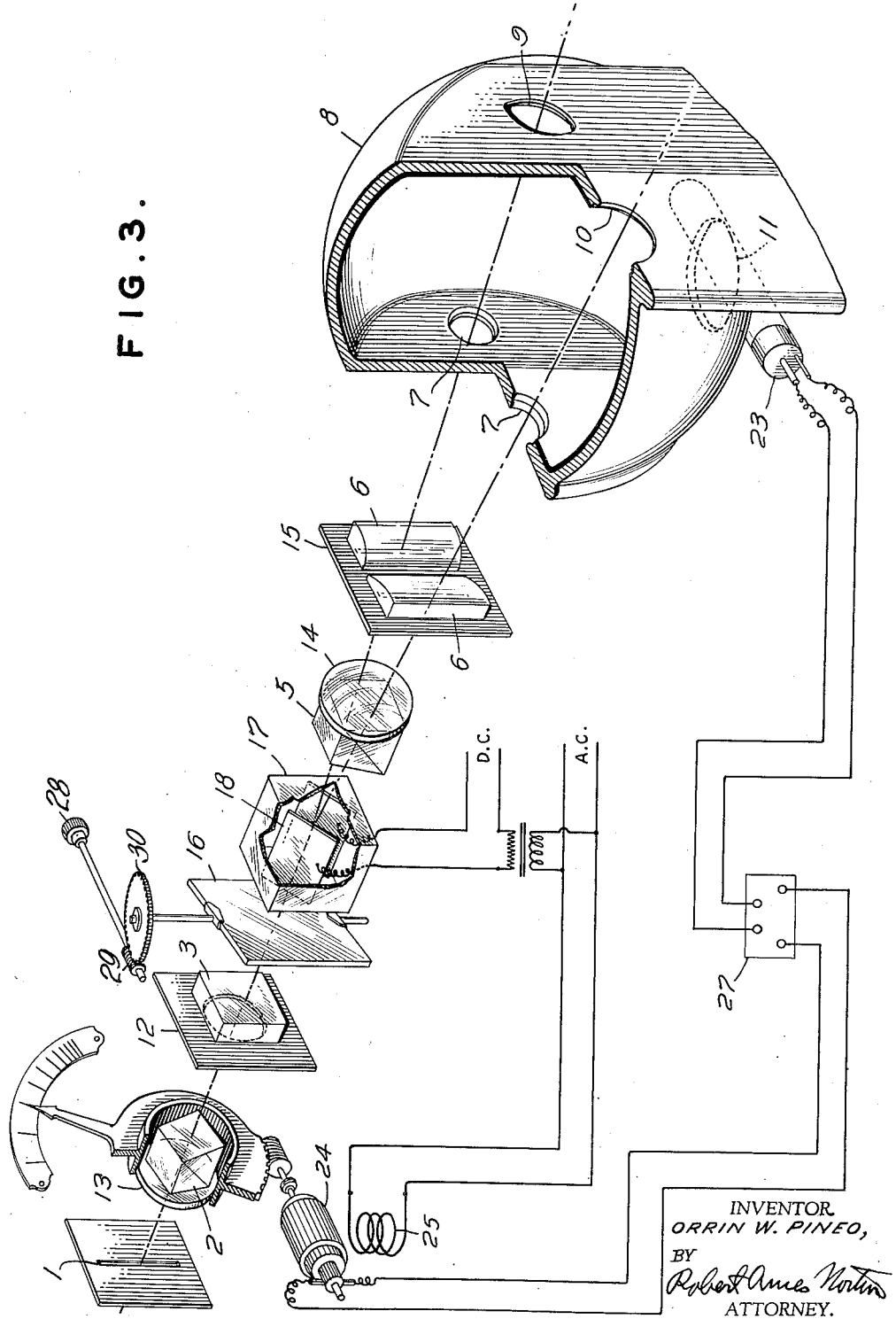
Fig. 3 is a perspective view of an optical system using a Kerr cell.

Fig. 3 shows an optical system similar to Fig. 1 but in which the electric birefringence of a Kerr cell is used in place of the half-wave plate 4 of Fig. 1. The other elements of the system bear the same reference numerals as in Fig. 1. The Kerr cell 17 is a glass cell containing a suitable liquid medium, for example nitrobenzene, and provided with two electrodes 18 between which the two polarized beams from the Wollaston prism 3 pass. The electrodes 18 which are placed at 45° to the planes of polarization of the beams are subjected to a varying electric voltage which varies the electrostatic field in the nitrobenzene between the two plates. Preferably this variation should be made unidirectional by applying a sufficient negative bias to one of the electrodes 18 and then applying an alternating current to the two electrodes, the peak voltage of the alternating current being equal to the negative bias. Due to the electric birefringence the varying electrostatic field will cause a varying retardation of the two beams which will cause them to differ in phase and hence will cause one beam to increase and the other to decrease and vice versa at a frequency which is equal to the frequency of the alternating voltage applied to the electrodes. The effect on the beams emerging from the Nicol prism 5 is similar to that effected in the optical system of Fig. 1 and the magnitude of the variation of the two beams will depend on the magnitude of the voltage applied to the electrodes 18.

Figure 4:
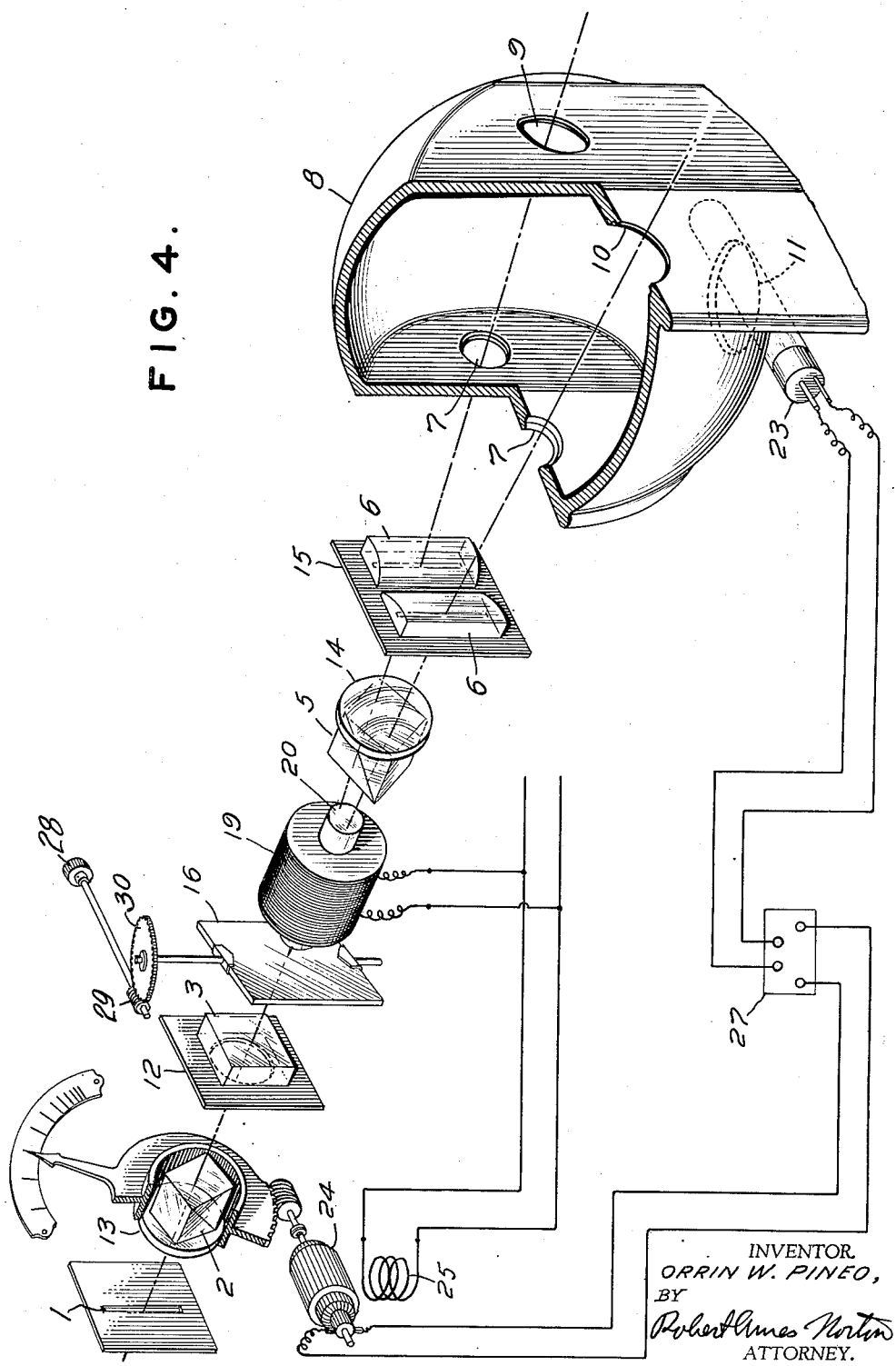
Fig. 4 is a perspective view of an optical system showing magnetic rotating means for varying the state of polarization of the emerging beams.

Fig. 4 shows an optical system similar to Fig. 1 in which a magnetic rotating means is employed instead of a half wave plate. The other elements of the optical system bear the same reference numerals as in Fig. 1. The magnetic rotating means is shown as a glass rod 20 surrounded by solenoid coil 19 having a large number of turns. The two beams from the Wollaston prism 3 pass through the glass rod. Alternating current is applied to the ends of the coil and the periodically varying magnetic field will cause the planes of polarization of the two beams to oscillate. The angular amplitude of oscillation depends on the field strength and is made $\pi/4$ at each side of the main position so as to produce complete extinction of one beam in each extreme position. The Nicol prism 5 following the magnetic rotating means is arranged at an angle of 45° so that the oscillations will cause each beam to pass from extinction to maximum brilliance.

The glass cylinder 20 may be replaced by any other suitable transparent medium.

Having thus described my invention, what I claim is:

1. A photometer having a flicker mechanism including in optical alignment the following elements, a source of light, polarizing means capable of producing two divergent beams polarized at right angles to each other, means for rotating the planes of polarization of the beams at predetermined frequency in opposite phases, a fixed polarizing element through which the rotating polarized beam pass before encountering the materials to be measured and an adjustable photometering element the adjustment of which varies the relative intensities of the two polarized beams.

2. A photometer containing a flicker mechanism for varying in opposite phase the intensity of two beams comprising in optical alignment a source of light, an adjustable photometering polarizer, means for splitting the light into two divergent beams polarized at right angles to each other, means for varying the states of polarization of said beams in opposite phases without substantial variation of the intensities of said beams and a fixed polarizing member through which the beams pass, said polarizing member producing two emergent beams which are non-varying in their state of polarization in the sense that the two ellipses symbolizing the states of polarization of the two beams are non-varying in eccentricity and in orientation but which fixed polarizing member causes the intensity of the non-varying polarized emergent beams to vary in opposite phases at flicker frequency.

3. A photometer according to claim 2 in which the means for producing two polarized beams and the means for varying the states of polarization of the said beams produce beams which are somewhat depolarized but in which the degrees of polarization of the two beams are non-varying.

4. A photometer according to claim 1 in which the means for rotating the planes of polarization of the beams includes a rotatable retardation plate.

5. A photometer according to claim 2 in which the means for varying the states of polarization of the beams includes a rotatable retardation plate.

6. A photometer according to claim 1 in which the means for rotating the planes of polarization of the beams includes a half wave plate.

7. A photometer according to claim 2 in which the means for varying the states of polarization of the beams includes a half wave plate.

8. A photometer according to claim 1 in which the means for rotating the planes of polarization of the beams is a medium in the light path exhibiting magnetic rotatory power, and means for creating a varying magnetic field surrounding said medium.

9. A photometer according to claim 2 in which the means for rotating the planes of polarization of the beams is a medium in the light path exhibiting magnetic rotatory power, and means for creating a varying magnetic field surrounding said medium.

10. A photometer according to claim 1 in which the means for rotating the planes of polarization of the beams comprises a medium in the light path exhibiting electric birefringence and means for creating a varying electric field in said medium.

11. A photometer according to claim 2 in which the means for rotating the planes of polarization of the beams comprises a medium in the light path exhibiting electric birefringence and means for creating a varying electric field in said medium.

12. A photometer according to claim 1 in which the beams after passing through the fixed polarizing element are caused to fall on an optical integrating means having mounts for a specimen and a standard and means for causing the beams to fall respectively on the said specimen and standard whereby light reflected from or transmitted by the specimen and standard is integrated, a photo electric device receiving the integrated light from said integrating means, means for amplifying the electric current produced by said photo electric means and rotating means for adjusting the photometering element actuated by the said amplified current.

13. A photometer according to claim 2 in which the beams after passing through the fixed polarizing element are caused to fall on an optical integrating means having mounts for a specimen and a standard and means for causing the beams to fall respectively on the said specimen and standard whereby light reflected from or transmitted by the specimen and standard is integrated, a photo electric device receiving the integrated light from said integrating means, means for amplifying the electric current produced by said photo electric means and rotating means for adjusting the photometering polarizer actuated by the said amplified current.

ORRIN W. PINEO.

CERTIFICATE OF CORRECTION.

Patent No. 2,126,410.  August 9, 1938.

ORRIN WESTON PINEO.

It is hereby certified that error appears in the printed specification of the above numbered patent requiring correction as follows: Page 2, first column, line 51, for "oposite" read opposite; page 3, first column, line 5, for "curent" read current; line 8, for "arangement" read arrangement; line 15, for "wil" read will; and line 20, for "monochomator" read monochromator; same page, second column, line 64, claim 1, for the word "beam" read beams; and that the said Letters Patent should be read with this correction therein that the same may conform to the record of the case in the Patent Office.

Signed and sealed this 27th day of September, A. D. 1938.

Henry Van Arsdale (Seal)  Acting Commissioner of Patents.